United States Patent [19]

Pendegraft

[11] 4,159,589
[45] Jul. 3, 1979

[54] AUTOMATIC HOOK SETTER

[76] Inventor: Alfred E. Pendegraft, Box #1, Main St., Summerfield, Ill. 62289

[21] Appl. No.: 855,911

[22] Filed: Nov. 29, 1977

[51] Int. Cl.² .............................................. A01K 97/12
[52] U.S. Cl. ................................................... 43/15
[58] Field of Search ...................................... 43/15, 16

[56] References Cited

U.S. PATENT DOCUMENTS

| 3,170,262 | 2/1965 | Hall ......................................... 43/15 |
| 3,699,701 | 10/1972 | Jacobs ..................................... 43/15 |
| 3,897,646 | 8/1975 | Sheets ..................................... 43/15 |

FOREIGN PATENT DOCUMENTS 7759 of 1894 United Kingdom ........................ 43/15

Primary Examiner—Nicholas P. Godici
Assistant Examiner—K. Bradford Adolphson
Attorney, Agent, or Firm—Clarence A. O'Brien; Harvey B. Jacobson

[57] ABSTRACT

A base is provided including a depending ground spike and a mount is swingably supported from the base for angular displacement about a horizontal axis between first and second positions. Structure is operatively connected between the base and the mount yieldingly biasing the latter toward the first position and the base and mount include coacting latch structure releasably latching the mount in the second position. The latch structure includes a latch release shiftable between active and inactive positions in which the latch structure is operative and inoperative, respectively, to retain the mount in the second position and the mount includes structure for stationarily supporting a fishing rod therefrom with the rod generally paralleling the plane in which the mount is swingable. The latch structure also includes a trigger operatively associated with the latch release structure and shiftable between latch and release positions in which the release structure is disposed in the active and inactive positions thereof, respectively. The trigger includes a portion thereof to be engaged by a fishing line supported from a rod stationarily positioned relative to the mount and to bias the trigger from the latch position thereof to the release position thereof in response to the fishing line being tensioned beyond a predetermined value.

2 Claims, 6 Drawing Figures

AUTOMATIC HOOK SETTER

BACKGROUND OF THE INVENTION

Substantially all types of fishing are becoming increasingly popular and fishing rods are used in many forms of fishing. Further, in most instances where a fishing rod is used, it is desirable for the hook at the free end of the associated fishing line to be "set" when a fish strikes the baited hook or equivalent lure. Accordingly, various forms of automatic hook setting devices have been heretofore designed. While some forms of automatic hook setters are adapted to be utilized in conjunction with specific rod structures and other forms of hook setting devices are designed to be utilized in specific forms of fishing, there are few automatic hook setting devices which may be utilized in conjunction with various types of fishing rods and also when various forms of fishing are carried out. Accordingly, a need exists for an improved automatic hook setting device which may be utilized in conjunction with various different forms of fishing rods and which may also be used effectively when carrying out different forms of fishing in which a rod is used.

Examples of various forms of automatic hook setting devices including some of the general structural and operational features of the instant invention are disclosed in U.S. Pat. Nos. 3,874,106, 3,881,269, 3,889,413, 3,956,845 and 3,997,117.

BRIEF DESCRIPTION OF THE INVENTION

The automatic hook setter of the instant invention is constructed in a manner whereby it may be utilized in conjunction with substantially all forms of fishing rods and perform its intended function when carrying out various forms of fishing operations. The hook setter may be utilized while still fishing from a boat or a bank, while trolling and even while ice fishing. Although the automatic hook setter is actuated by fishing line pull and the line pull during a trolling operation before a fish strikes may exceed the line pull while still fishing at the time a fish strikes, a single expansion spring component of the hook setter may be readily changed to vary the operating tension thereof in order to convert the hook setter for trolling operations as opposed still fishing operations.

The main object of this invention is to provide an automatic hook setter which may be utilized in conjunction with substantially all forms of fishing rods.

Another object of this invention is to provide a hook setter which may be utilized either for trolling operations or for still fishing operations.

Still another object of this invention is to provide a hook setter in accordance with the preceding objects and which may be utilized either from a boat or while fishing from a stream or lake bank.

A final object of this invention to be specifically enumerated herein is to provide an automatic hook setter in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
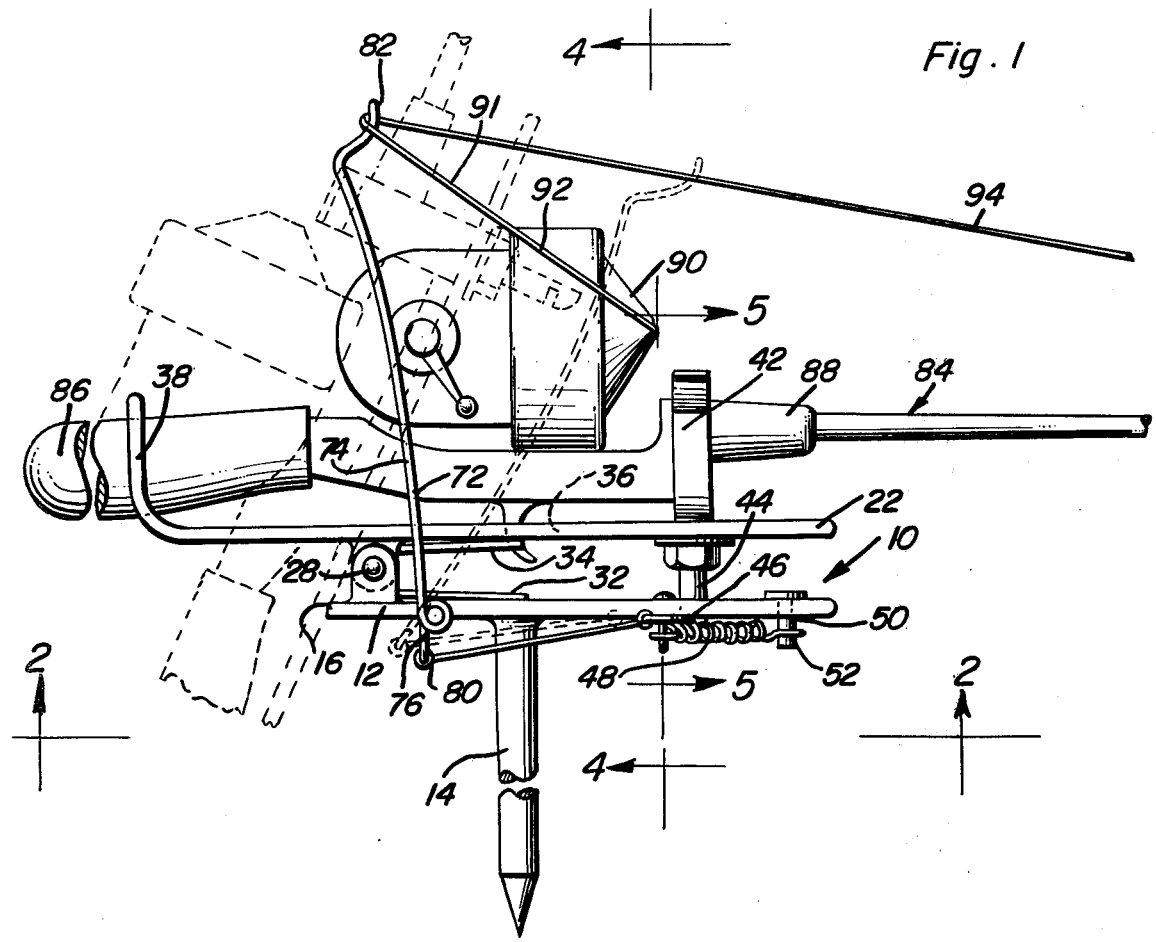
FIG. 1 is a side, elevational view of the hook setter of the instant invention with a conventional form of fishing rod operatively associated therewith and alternate positions of the mount portion and the associated fishing rod being illustrated in phantom lines.

Referring now more specifically to the drawings, the numeral 10 generally designates the hook setter of the instant invention. The hook setter 10 includes a horizontal base plate 12 from which a depending ground spike 14 is supported. The base plate 12 is horizontally elongated and the ground spike 14 depends downwardly therefrom centrally intermediate its opposite ends. The rear end of the base plate 12 defines an abutment surface 16 for a purpose to be hereinafter more fully set forth and includes a pair of laterally spaced upstanding opposite side mounting ears 18 and 20.

A generally horizontal mounting plate 22 overlies the base plate 12 in vertically spaced relation relative thereto and includes a pair of depending mounting ears 24 and 26 received between and pivotally supported from the mounting ears 18 and 20 by means of a pivot shaft 28 secured through the ears 18, 20, 26 and 24.

A butterfly spring 30 is coiled about the central portion of the shaft 28 and includes a first arm 32 which bears against the upper surface of the base plate 12 and a second arm 34 which bears against the underside of the mounting plate 22. Further, the mounting plate 22 includes a central elongated vertical opening 36 formed therethrough and the rear end of the mounting plate 22 defines a vertical frame 38 defining a horizontal opening 40 therethrough. The forward end of the mounting plate 22 includes an upwardly opening spring clip 42 secured to the mounting plate 22 by means of a latch bolt 44 secured downwardly through the base of the clip 42 and the mounting plate 22 and extending below the latter. The lower end of the latch bolt 44 is notched at 46 and the lower terminal end of the latch bolt 44 is beveled at 48.

Figure 2:
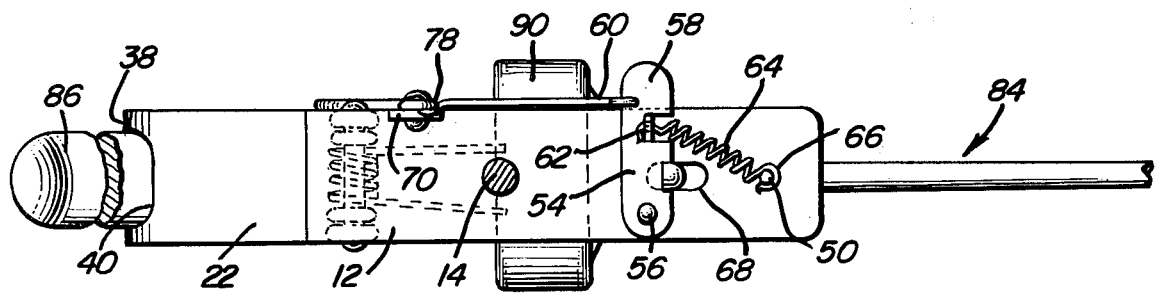
FIG. 2 is a horizontal, sectional view taken substantially upon the plane indicated by section line 2—2 of FIG. 1.
Figure 3:
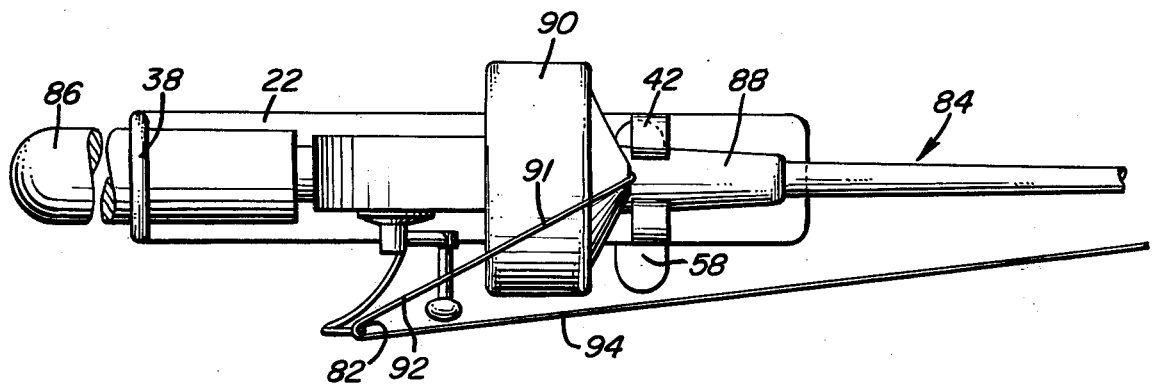
FIG. 3 is a top plan view of the assemblage illustrated in FIG. 1.
Figure 4:
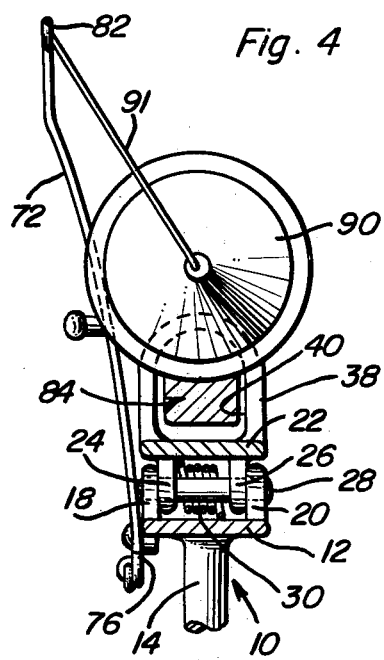
FIG. 4 is vertical, sectional view taken substantially upon the plane indicated by section line 4—4 of FIG. 1.
Figure 5:
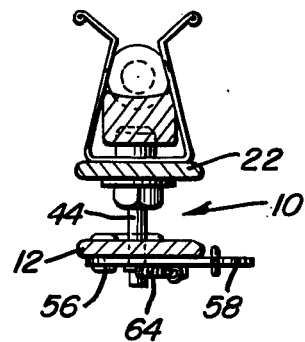
FIG. 5 is a vertical, sectional view taken substantially upon the plane indicated by section line 5—5 of FIG. 1.

A retaining stud 50 is secured downwardly through the forward end of the base plate 12 and includes a peripheral groove 52 adjacent its lower end. A latch plate 54 is swingably supported from the underside of the base plate 12 by means of a pivot fastener 56 and includes a free end portion 58 to which one end of a connecting link 60 is pivotally connected. A first intermediate portion of the latch plate 54 includes a right angularly struck depending anchor tab 62 to which a first end of a replaceable anchor spring 64 is releasably anchored. The second end of the anchor spring 64 is hooked as at 66 and releasably seated in the groove 52 formed adjacent the lower end of the stud 50. Accordingly, the spring 64 biases the latch plate 54 in a clockwise direction as viewed in FIG. 2 with the leading edge of the latch plate 54 seated in the notch 46. Of course, the lower beveled end 48 of the latch bolt 44, upon being displaced downwardly through the elongated opening 68 formed in the base plate 12, is operable to cam the latch plate 54 from the position thereof illustrated in FIG. 2 of the drawings in a counterclockwise direction whereby the latch plate 54 may be engaged with the notch 46 upon further downward movement of the latch bolt 44.

A depending mounting tab 70 is also carried by the base plate 12 closely forward of the mounting ears 18 and 20 and a bell crank or lever 72 including a first lever arm 74 and a second lever arm 76 is pivotally supported from the mounting tab 70 as at 78 and the end of the connecting link 60 remote from the latch plate 54 is pivotally anchored to the lever arm 76 as at 80. The free end of the lever arm 74 includes a laterally offset hook portion 82.

In operation, the components of the hook setter are initially positioned as illustrated in FIG. 1 of the drawings and a fishing rod referred to in general by the reference numeral 84 may have its handle portion 86 inserted through the opening 40 in the frame 38 and its forward grip 88 releasably clampingly engaged in the spring clip 42. In this position, a spinning reel 90 supported from the rod 84 is disposed between the spring clip 42 and the frame 38. The fishing line 91 extends laterally outwardly and upwardly from the forward portion of the spinning reel 90 as at 92 and passes about the hook 82 and then forwardly as at 94 to be slidingly received through the line guides (not shown) supported from the rod 84 along the length thereof. When a sufficient pull is exerted on the line 91, the lever arm 74 is swung forwardly and downwardly from the position illustrated in solid lines in FIG. 1 to the position illustrated in phantom lines in FIG. 1 and the lever arm 76 is swung rearwardly to exert a rearward pull on the connecting link 60 to thus rearwardly displace the free swinging end of the latch plate 54 and swing the latter out of the notch 46 thereby releasing the latch bolt 44 for upward swinging movement with the forward end of the mounting plate 22 under the biasing action of the spring 30. Thus, the forward or right hand end of the rod 84 is elevated in order to exert a pull on the line 91 to "set" the hook on the free end thereof. Of course, when it is desired to reset the hook setting device, it is merely necessary to swing the mounting plate 22 from the phantom line position thereof illustrated in FIG. 1 to the solid line position in FIG. 1 whereupon the latch plate 54 will again engage the latch bolt 44 to retain the mount plate 22 in its solid line position.

When the mounting plate 22 swings to the phantom line position illustrated in FIG. 1, the underside of the rear end of the mounting plate 22 rearward of the shaft 28 abuts the abutment surface 16 to limit counterclockwise swinging of the mount plate 22 as seen in FIG. 1.

Figure 6:
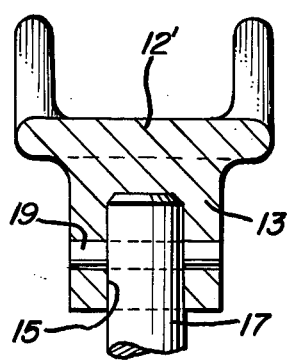
FIG. 6 is a fragmentary, enlarged, vertical, sectional view illustrating an alternate manner of mounting a ground spike from the base of the hook setter.

With attention now invited more specifically to FIG. 6 of the drawings, a modified form of base plate 12' is illustrated. The base plate 12' is substantially identical to the base plate 12, except that the plate 12' includes a depending mounting boss 13 having a downwardly opening blind bore 15 formed therein. The upper end of a support shank or spike 17 is releasably secured within the bore 15 by means of an anchor pin 19 secured diametrically through the mounting boss 13, the bore 15 and the shank 17. If it is desired, the lower end of the shank 17 may be pointed for use as a ground spike. However, the shank 17 may be considerably shorter than that required by a ground spike and may be rounded for support from a boat mounted fixture defining an upwardly opening socket for receiving an oarlock. In addition, other forms of bases may be carried by the lower end of the shank 17.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An automatic hook setter including an elongated horizontal base having first and second ends, an elongated horizontal mount having first and second ends, said mount being spaced above and overlying and extending along said base with the first end of said mount swingably supported from the first end of said base for angular displacement of said mount relative to said base about an axis extending transversely of said base and mount and between a first position with the second end of said mount spaced closely adjacent the second end of said base and a second position with said second end of said mount displaced away from the second end of said base, said second end of said base having an upstanding opening formed therethrough, said second end of said mount including a depending shank having a notch formed therein and projectable through said opening upon movement of said mount from said second position toward said first position, an elongated latch lever having first and second ends and underlying said base with said first end of said lever pivotally supported from said base for swinging about an upstanding axis between an inactive position with the second end of said lever spaced laterally to one side of said opening and an active position with the second end of said lever registered with said opening and engaged in the notch in said shank to prevent the latter from being withdrawn from said opening and swinging of said mount from said first position toward said second position, spring means connected between said lever and base yieldingly biasing said lever toward said active position, an elongated trigger arm having opposite ends, said trigger arm being pivotally supported from said base intermediate the opposite ends of said trigger arm for angular displacement of the latter about a transverse axis generally paralleling said axis extending transversely of said base, one end of said trigger arm being of a configuration adapted to be engaged by a fishing line supported from a fishing rod, an elongated connecting link extending and pivotally connected between the other end of said trigger arm and the other end of said latch lever, said one end of said trigger arm being adpated to have the fishing line engaged thereover in a manner such that tensioning of said line beyond a predetermined value will cause angular displacement of said trigger arm and thus angular displacement of said latch lever from said active position to said inactive position.

2. The combination of claim 1 wherein said base includes a depending ground spike.

* * * * *